(12) United States Patent  
Jonsson et al.

(10) Patent No.: US 7,870,282 B2
(45) Date of Patent: Jan. 11, 2011

(54) MEDIA SHARING NETWORK (75) Inventors: Karl Jonsson, Rancho Santa Margarita, CA (US); Stefan H. Andersen, Trabuco Canyon, CA (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 12/276,732

(22) Filed: Nov. 24, 2008

(65) Prior Publication Data

US 2010/0131613 A1    May 27, 2010

(51) Int. Cl.
G06F 15/16 (2006.01)
G06F 12/00 (2006.01)

(52) U.S. Cl. .................. 709/231; 709/250
(58) Field of Classification Search ......... 709/217–218, 709/231–236, 250
See application file for complete search history.

(56) References Cited

U.S. PATENT DOCUMENTS

| | | | | |
|---|---|---|---|---|
| 6,055,543 A | * | 4/2000 | Christensen et al. ............ 1/1 |
| 7,685,459 B1 | * | 3/2010 | De Spiegeleer et al. ........ 714/6 |
| 7,689,764 B1 | * | 3/2010 | De Spiegeleer et al. ..... 711/108 |
| 2003/0046274 A1 | * | 3/2003 | Erickson et al. ................ 707/3 |
| 2003/0224823 A1 | * | 12/2003 | Hurst et al. ................. 455/558 |
| 2005/0234844 A1 | * | 10/2005 | Ivanov ........................ 707/1 |
| 2008/0183826 A1 | * | 7/2008 | Notani ....................... 709/206 |
| 2008/0215744 A1 | * | 9/2008 | Shenfield .................... 709/231 |

* cited by examiner

Primary Examiner—Zarni Maung
(74) Attorney, Agent, or Firm—Haynes and Boone, LLP.

(57) ABSTRACT

A computer-readable medium has a computer program stored thereon. The computer program senses the presence of a physical medium loaded on a media-sharing network and senses the presence of metadata and content on the physical medium. The computer program wraps the metadata and the content in a container. The container includes the location of the metadata and the location of the content. The computer program assembles the container such that it is recognized as a virtual physical medium on the media sharing network and such that it enables playback of the content by control commands compatible with a media sharing protocol.

21 Claims, 7 Drawing Sheets

MEDIA SHARING NETWORK

TECHNICAL FIELD

The present disclosure relates generally to home network media sharing.

BACKGROUND

Content from a physical medium (e.g. DVD, BluRay disc or other medium) may be copied or backed-up to a data storage device (e.g. a PC hard drive, network attached storage (NAS) or other data storage or memory device) for use on a media sharing network, such as a Universal Plug and Play (UPnP) network. When the content is backed up to data storage, the primary or main data track (e.g. main movie on a DVD or BluRay disc) is copied or stripped off from the physical medium without various other data or features available on the physical medium, for example without meta-data, special features, scene selection menus and other features or data. The main data track is also typically encoded using a video codec. As a result, a user's experience in the home with backed-up content may be more limited than it would be using the physical medium directly, backing up the media may take more time due to the encoding, and the experience may require expensive or cumbersome hardware and software, as well as specialized know-how or experience. Adding content to a network may therefore be more time-consuming and less efficient or simple than desired.

DESCRIPTION

Overview

In an example embodiment, a computer-readable medium has a computer program stored thereon. The computer program extracts a unique identifier of a physical medium and uses the unique identifier to query a metadata server for metadata related to the physical medium. The program downloads the metadata, stores it in a first folder and wraps the first folder in a container. The container has a data structure such that it presents itself to a media sharing network, for example a plug-and-play network, as a virtual physical medium. The data structure enables playback of content in a user's home from the physical medium using control commands compatible with a media sharing protocol, for example a plug-and-play protocol. In an example embodiment, the computer program also extracts the content from the physical medium, stores the content in a second folder, and wraps the second folder in the container.

Wrapping the metadata in a metadata folder compatible with the media sharing network may provide a user with a full physical medium experience using information backed up on a storage device using the convenience of a network controller.

In an example embodiment, the physical media experience may be adopted "virtually" in a home entertainment-networked home. For example, content from a navigation-enabled presentation (NEP), for example content derived from a DVD, BluRay or HD-DVD disc, may be virtually shared over a UPnP network and played on a UPnP renderer with a compatible navigator, for example a DVD navigator.

Playing content directly from a "virtual" physical medium stored electronically, instead of playing a "video file" ripped from a physical medium, may provide a user with virtually the same experience as playing the physical medium (e.g. DVD, BluRay or HD-DVD) directly from a physical medium player, including features such as menus, title menus, spoken language selections, subtitle selection, multi-angle viewing, extra features and other features not typically transferred when creating an electronic backup from a physical medium.

Content from physical media may be copied or backed-up to a data-storage platform from a physical media drive (e.g. an optical disc drive such as a DVD or BluRay drive). The content may be in the form of a presentation, for example an audio/video presentation provided on a laser-read disc, for example digital versatile disc (DVD), BLURAY or HD-DVD. Such content may be played from some navigable content interface—and such content is generally referred to herein as navigation-enabled presentations (NEP).

NEPs are copied to a data-storage platform, for example, a PC or a Network Attached Storage (NAS) device or any other device that may share a back-up of an NEP with a media sharing electronic media server. For example, the storage platform may be media sharing protocol enabled, for example Universal Plug and Play AV (UPnP AV) enabled and may be hooked up to a UPnP AV network for presentation on a display device of a network, for example UPnP AV network which may be a home entertainment network.

The NEP content may be processed and decoded by allowing random access to the files contained in the presentation. For example, current transportation mechanisms in UPnP may support accessing or playing the NEP in their current form. As such, vendors may be enabled to use pre-existing presentation engines to present such NEPs and supporting may be done with reduced effort over other methods. The NEPs are therefore stored in their original format, without manipulating or encoding the data in any way, in other words as an unmodified DVD image which does not require DVD navigation support in the UPnP renderer.

For example, the NEP may include content data wrapped up in a container, for example a Digital Living Network Alliance (DLNA) container, and may be presented as a single UPnP source, including meta-data and extra features which might otherwise not have been stored during backup or copying using a protocol that encodes content for storage, backup or playback. In other words, no content data may be lost during the backup and storage procedure, and none of the content data features available on the original physical medium may be lost. Instead, a user's experience with the backed-up content data may be similar or identical to the experience possible using the physical medium directly. For example, a NEP user playing the NEP from backed-up data may play a virtual "DVD" from network attached storage (NAS) with full access to special features, menus, and user options that would have been available on the physical DVD. In addition, there may be no need for codecs, no need to use the computing power necessary to encode or manipulate content data, and less user know-how or experience may be required in comparison with some other downloading and back-up procedures.

In other embodiments, not all of the content is copied or backed up, for example, in the case of "guest" media. Guest media may be media, for example a DVD or other physical medium, owned by someone other than the home network user/owner. The home network user may not have the right or permission to copy content from "guest" media onto the network for later playback. However, in an example embodiment, the user may nonetheless be able to play such "guest" media on the network without copying the content. The "guest" media may be playable only when the physical "guest" media is physically present in the system. In an example embodiment, only the metadata related to the features or the content may be copied into an NEP container. The physical medium may then be accessed and controlled through the NEP container which may not include all of the content data. However, metadata, information and a thumbnail image may be used for browsing the content on the network and accessing and displaying the content through the UPnP, without having to use a controller for the physical medium controller.

In another example embodiment, a device may have an optical disc drive or other physical medium reader attached, and may control access and/or playback of such physical media directly, without copying or backing up all of the content, for example without copying or backing up a main movie of a DVD. In other words, an application may detect the presence of the physical medium, create a metadata file and a container cross-referencing the metadata with the physical medium. The content on the physical medium server may be played without using a controller for the physical medium server. The media sharing network may detect the presence of the content, and control access and playback of the content through the metadata file as described in more detail below.

In example embodiments, a network may include appropriate security measures to prevent or inhibit unauthorized copying, viewing or distribution of media in violation of any copyright or other restrictions on use.

Description of Example Embodiments

Figure 1:
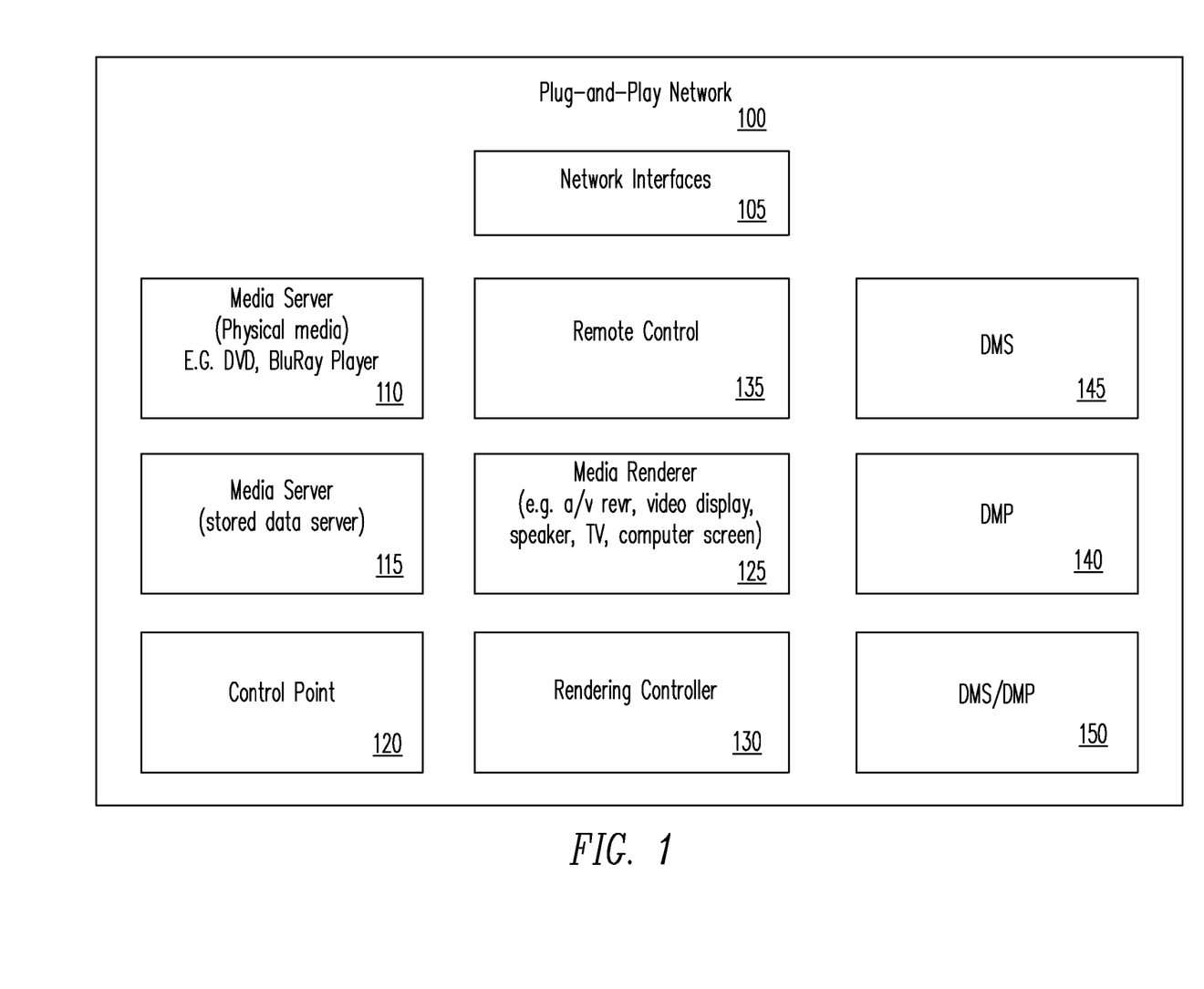
FIG. 1 is a block diagram of an example embodiment of a media-sharing network.

FIG. 1 illustrates an example embodiment of a media-sharing network 100, for example a so-called "plug-and-play" media sharing network. Media-sharing network 100 or plug-and-play network may include a number of devices, each of which is enabled to communicate with one another according to a media sharing protocol or application. A media sharing protocol is a communication protocol by which networked devices may search for and discover or detect the presence of new devices on the network, may share information about each device and its capabilities and the presence of content to be displayed, may control or be controlled by other devices on the network, may respond to a list of specified commands or events, and may display content from a networked device on the same or other networked device. For example, a media sharing network may enable a network control device to detect content in some media format and display the content on a networked display device or media renderer. Media sharing protocol may enable a user to render a variety of different physical media or electronic media formats for display on a networked display device. A media sharing protocol may be referred to as a plug-and-play protocol when the protocol provides for automatic searching, detecting and communication upon connecting, or plugging, a device to the network. Plug-and-play refers to the ability of a user to plug in a new device—and play the device, without the need to manually set up or configure the network. The protocol may perform the set up and configuration, or the devices may be set up and configured, without user interaction.

In an example embodiment, such a media sharing protocol may be the UPnP AV protocol, supervised by the Digital Living Network Alliance (DLNA, formerly: Digital Home Working Group), a forum of vendors and manufacturers who work in the home entertainment industry. For convenience, many of the example embodiments in this disclosure are expressed in terms generally relating to the UPnP AV protocols. However, the ideas expressed in this disclosure are not limited to a specific protocol, they may be applicable to other existing protocols or future protocols or any other media sharing protocol or application. Other protocols include, for example, UPnP, DLNA, HAVi and the JAVA-based JINI standards and/or protocols. Persons of ordinary skill in the art may appreciate that the ideas discussed herein may be applied generally to any number of the existing or future media sharing protocols or applications and may be applicable to protocols based on combinations of such protocols, to the extent that they are compatible.

In an example embodiment, the network 100 may be a local area network and each device in the network may have a network interface or interfaces 105 to provide access to the network 100. The network interfaces 105 may include, for example, a wireless network interface having antenna or antennae, wired network interface to communicate via a network cable such as, for example, an Ethernet cable, a coaxial cable, a fiber optic cable, a serial cable or a parallel cable.

The network interface(s) 105 may provide access to the network by conforming to some communications standard, for example IEEE 802.16, IEEE802.11b and or IEEE 802.11g standards. The network interface(s) 105 may also provide access to a personal area network, for example, by conforming to Bluetooth standards or any other applicable communications standard or protocol. The network interface(s) 105 may alternatively provide wireless communications using, for example, Time Division, Multiple Access (TDMA) protocols, Global System for Mobile Communications (GSM) protocols, Code Division Multiple Access (CDMA) protocols and/or any other type of wireless communications protocol.

Network Devices

In an example embodiment, the network 100 may include various media sharing enabled devices. Each device may be enabled to communicate in the network according to a specific media-sharing network protocol or standard set of commands.

Figure 4:
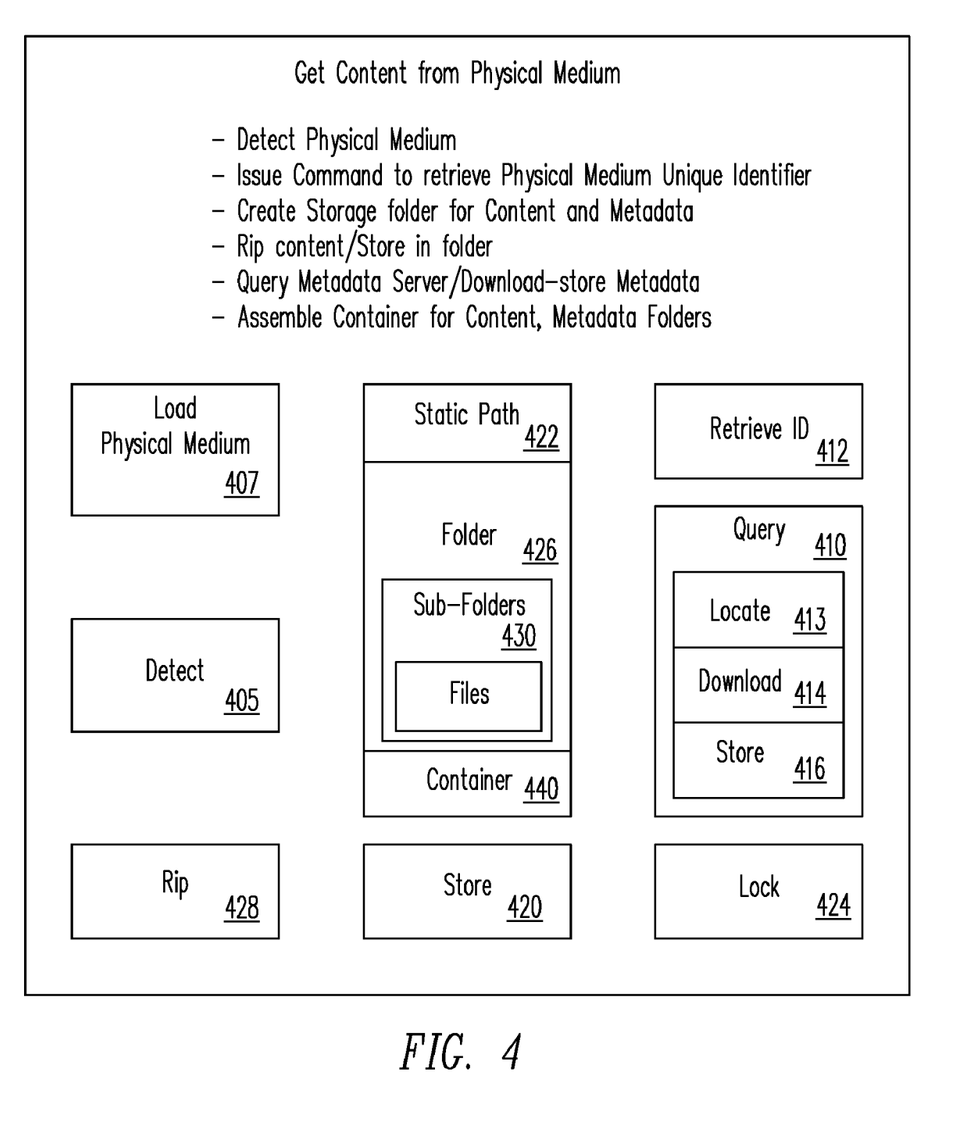
FIG. 4 is a block diagram of an example embodiment of a method of getting content to be stored on a media-sharing network.

In an example embodiment, media sharing enabled devices may include a media server 110, 115, a 'slave' device that may share or stream media data or content (for example audio/video/picture/files) to other client devices on the media sharing network. A media server may be a physical media server 110, for example a DVD player or BluRay player that may share content from a physical disc or other physical device loaded in the server. A media server may also be a stored content server 115, which may play content stored in a digital form on a storage platform or memory device and which may be shared over the network. Such stored data may be backed-up from a physical medium 212 (FIG. 2) and loaded 407 (FIG.

4) onto the physical media server 110. A digital media server 115 may provide media acquisition, recording, storage, and sourcing capabilities, as well as content protection enforcement as required. In the UPnP AV protocol, for example, a media server may be referred to as a digital media server (DMS) or UPnP MediaServer DCP.

Media sharing network 100 may also include a control point 120, a 'master' device that can auto-detect media servers on the network to browse and stream media/data-files from them. The media sharing network 100 may have more than one control point 120. Each control point may have the ability to find content exposed by a media server and match it to the rendering capabilities of a renderer 125, setting up the connections between the media server 115 and the renderer 125. In the UpnP AV protocol, for example, the control point 120 may be referred to as a digital media controller (DMC) or UPnP MediaServer ControlPoint. One example embodiment of a control point is an intelligent remote control. A multifunction device such as a mobile multi-media phone may also include a control point.

In an example embodiment, the media sharing network 100 may include the media renderer 125, a 'slave' device that may render content for display or playback, for example audio, video or visual display. The media renderer 125 may play content received from a media server 110, 115 after being setup by another device, for example the control point 120. Media renderers 125 may include, for example, audio/video receivers, video displays, speakers, televisions, computer screens or other device capable of rendering content representative of the data/content being played. In the UpnP AV protocol, for example, a media renderer may be referred to as a digital media renderer (DMR) or UPnP MediaRenderer DCP.

In an example embodiment, the media sharing network 100 may include a rendering control 130, namely the ability to control various settings for the rendered content, for example volume, brightness, RGB, sharpness or other setting applicable to the particular content being rendered. In the UpnP AV protocol, for example, the rendering control 130 may be referred to as UPnP RenderingControl DCP. In an example embodiment, rendering control 130 and renderer 125 may be combined in a single device or resident on two, separate physical devices each connected to the network.

In an example embodiment, in which the content to be rendered is a still image or single video frame, the renderer 125 may be a media sharing enabled printer. In the UPnP protocol, a printer may be referred to as a Digital Media Printer (DMPr) device. Although photo printing is the application DLNA prioritized, other types of content may also be printed from a DMPr. When selected for media output, a DMPr combines images with an Extensible HyperText Markup Language (XHTML) template to create the printed page. A DMPr may be based on the UPnP PrintEnhanced:1 Service and the W3C XHTML Print specification.

In an example embodiment, the media sharing network 100 may include a remote user interface 135, or remote control. The remote user interface 135 may send/receive control-commands between a client device and a server over the network. Such commands may include record, schedule, play, pause, stop or other commands available to a particular type of content on a particular type of server and available for use by a user. In the UPnP AV protocol, for example, the remote user interface 135 may be referred to as a UPnP Remote User Interface (RUI) client/server. The remote user interface 135 may be an intelligent remote with a control point.

In an example embodiment, one or more of the features described above may be implemented in separate devices or in the same device or component in various combinations. Moreover, there may be one or more of each component present within the network. For example, a media player may include control point and rendering capabilities. A digital media player, for example, a UPnP Digital Media Player (DMP) 140 device, may find content exposed by a media server 110, 114, for example a UPnP Digital Media Server (DMS) 145 and pull the selected content from the server to provide playback and rendering capabilities. Some examples of media player devices may include televisions, stereo and home theaters; personal digital assistants, multimedia mobile phones, wireless monitors and game consoles. In another example embodiment, a DMS/DMP device 150 may have media server functionality as well as media player capabilities, and may also have intelligence, such as device and user services management, rich user interfaces and media management, aggregation and distribution functions.

Figure 2:
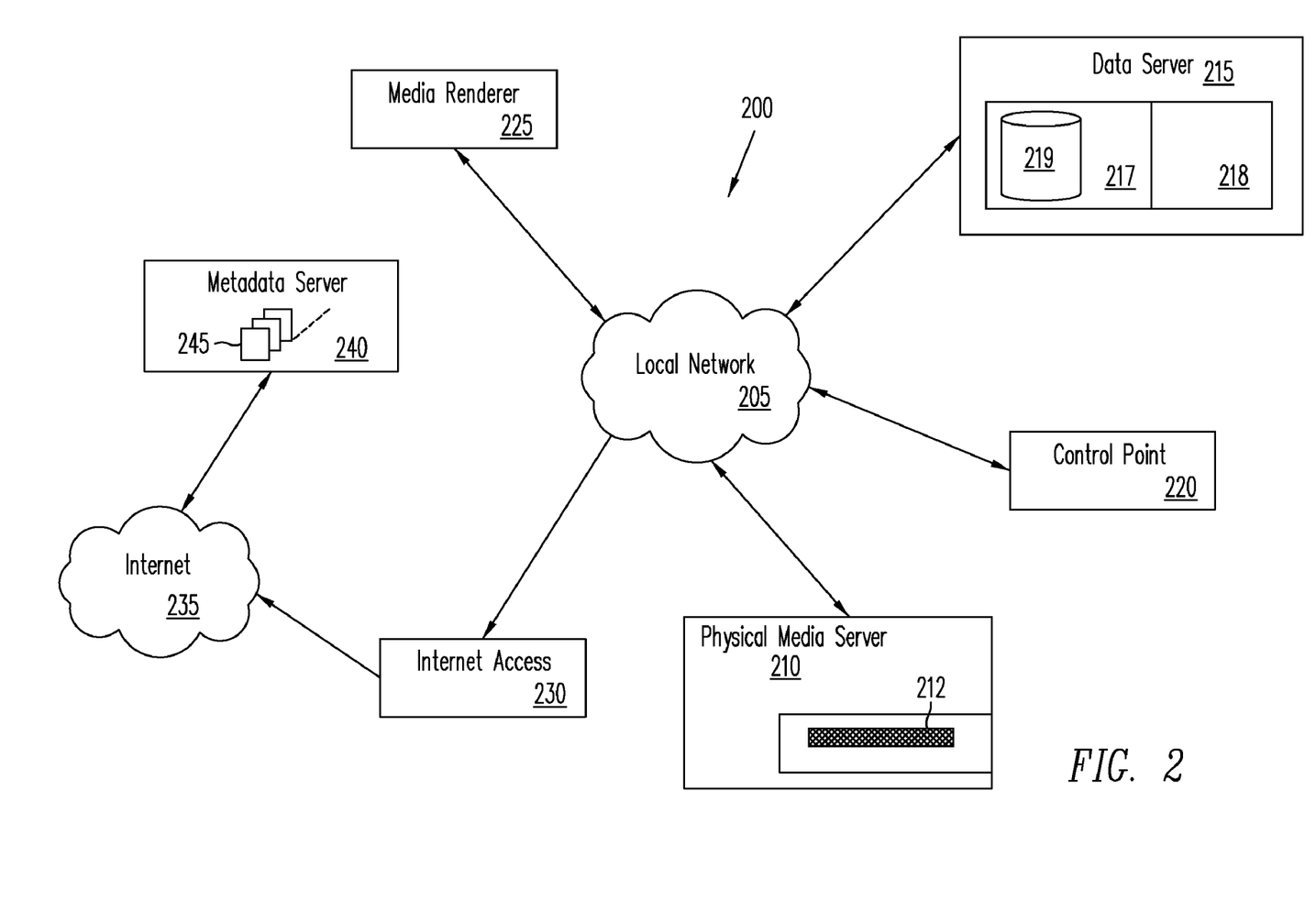
FIG. 2 illustrates an example embodiment of a media-sharing network.

FIG. 2 illustrates an example embodiment of a media sharing network 200. The network 200 may include a local network 205 for networking a plurality of media sharing devices, for example plug-and-play enabled devices. The media sharing devices may include a physical medium server 210, a stored-content media server 215, a control point 220 and a renderer 225. In example embodiments, these devices may be resident in physically separate devices or some or all of the device functionalities may be built into a single or multiple devices, each with one or more of the functional device features.

The network 200 may include an outside network access point 230, for example an Internet access point, which may provide access to an outside network 235 such as the Internet. A metadata server 240, with metadata relating to various physical media products, may be available for download. The metadata server 240 may be connected to the outside network 235 for communication with the shared media network 200 through the outside network access point 230. The metadata server 240 may have metadata records 245 associated with particular content available on a physical medium (e.g., metadata related to a movie available on a DVD, BluRay or HD-DVD disc). The metadata records 245 may be accessed and downloaded be referring to a unique identifier associated with the particular content, for example, a universal product code (UPC).

In an example embodiment, a physical medium 212 may be loaded onto the physical medium server 210. The control point 220 may detect the presence of the medium 212 and may permit a user to backup content from the physical medium 212 to data storage 217 on a stored-content media server 215, for example a network attached storage device (NAS). The communication among the devices may be performed according to a particular media sharing or plug-and-play protocol, for example UPnP AV.

In an example embodiment, the backed-up content may be stored in a data structure 219, which may include data files, folders and/or a container, which presents itself to the media sharing network 200 as a 'virtual' physical medium or NEP. The data structure 219 may be based on a standard DLNA container format and may be adapted to appear as a physical medium, as described in more detail below with respect to FIGS. 5 and 5A.

In an example embodiment, the physical medium 212 may be an audio/visual disc, such as a DVD or a BluRay disc with content, including for example a movie, menu and/or accompanying features. The data structure 219 may appear to the media sharing network as a DVD or a BluRay disc and may be playable as though it were a DVD or BluRay disc by a control point 220 or media player on the network 200.

In an example embodiment, the stored data of the data structure 219 may include additional data not copied from the disc, for example downloaded metadata 245 associated with the content available on the physical medium 212. For example, a metadata client 218, for example one resident on a network attached storage (NAS) device, may access the metadata server 240 on the outside network 235 via the outside network access point 230. Metadata records 245 downloaded from the metadata server 240 and communicated to the network 200 may be downloaded and stored on the stored media server 215 and associated with the backed-up data in the data structure 219 ripped from the physical medium 212 and stored on the server 215. The metadata records 245 may include, for example, a thumbnail image of a cover associated with the physical medium 212 (for example a movie cover for a DVD or BluRay disc). The metadata may also contain cast biography and/or any other information related to or about the media content. The metadata may be accessed with reference to a unique identifier associated with the physical medium, for example an UPC code (e.g. a bar code number) associated with the particular content or product represented by the physical medium 212. The metadata 245 may be stored and/or wrapped into the NEP data structure 219 stored data file or files and/or container.

The control point 220 may permit a user to scroll a list of stored NEP data records 219, for example by browsing thumbnail images of movie disc covers. The user may identify, select and present the data structure 219 to be played on a media renderer 225. In an example embodiment, the user experience of playing the NEP from the data structure 219 may be identical to the user experience of a user playing the physical medium 212 directly from the physical medium server 210. In other words, all menus, special features and other content available from the physical medium may be rendered from the content stored in the data structure 219.

Figure 3:
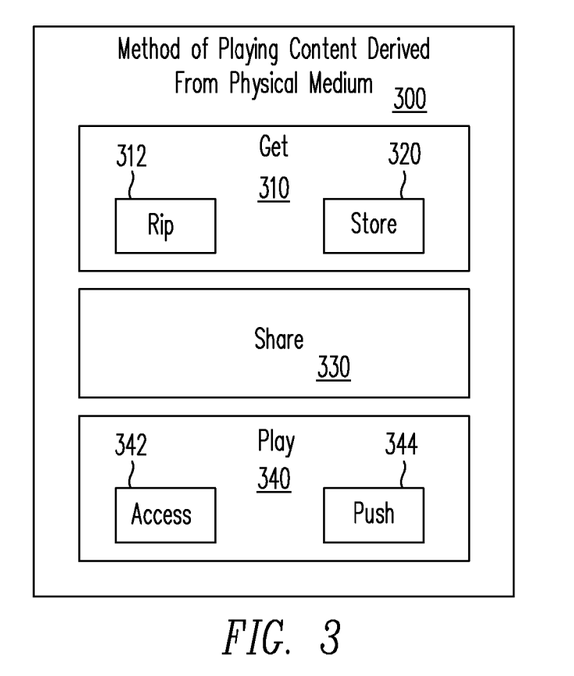
FIG. 3 is a block diagram of an example embodiment of a method of rendering content on a media-sharing network.

FIG. 3 illustrates an example embodiment of a method 300 for operating a media-sharing network, for example a plug-and-play network. In an example embodiment, the method 300 for operating a media-sharing network may include getting content 310 from a physical medium, sharing the content 330 with the network and playing the content 340 on the network. Getting the content 310 may include ripping information from the physical medium 312 and backing up or saving the content on a storage device 320. Sharing the content 330 may include presenting the stored content as a 'virtual physical medium', for example by wrapping up the content in a file format or container format that includes metadata and/or the features available on the original physical medium, information necessary for playing the content and presenting the content to the network according to the media sharing protocol in such a manner that the network control devices identify the stored content as though it were the physical medium and can playback the content as though it were playing back the physical medium. Playing the content 340 on the network may include accessing the content 342 from a control point and pushing the data 344 to a network renderer for playback, as though the stored content were a physical medium.

FIG. 4 illustrates an example embodiment of a method of getting content 400 (310 in FIG. 3) for a media sharing network. Getting content 400 may include detecting a physical medium 405 from a physical medium server. The network may detect 405 the physical medium when the medium is loaded 407 onto a media sharing enabled physical medium server, such as a DVD, BluRay or HD-DVD player or any device with such a player built in, including, for example, a computer disc drive.

Getting the content 400 may also include querying a metadata server 410. In order to access and locate the specific metadata corresponding to the particular physical medium, a metadata client or application may first issue a command, for example an ATAPI command, to retrieve a unique ID code 412 from the physical medium, such as a UPC code.

In an example embodiment, the metadata client application may be resident on the storage device or other device on the network. The metadata client may use the physical medium's unique ID code (e.g. UPC code) to query a metadata server 410 to locate various metadata 413 associated with the content of the physical medium for use on the media sharing network. The metadata may be downloaded 414 from the metadata server and stored 416 within a metadata folder and/or file. For example, a meta.xml file may be stuffed with the results from the metadata server query.

In an example embodiment, the metadata server query may have identified a thumbnail graphic file corresponding to or representative of the content of the physical medium being backed up and/or prepared for use over a media-sharing network. For example, where the physical medium is a DVD movie, a thumbnail picture of the movie's DVD cover may be retrieved from a metadata server and stored in the metadata folder. The thumbnail may be available for viewing on the media sharing network in searching for content, for example NEPs, to be played or rendered.

Storing the content 420 may include defining a static path 422 on a data storage device (e.g. NAS) on which the content and/or information, data or metadata will be backed-up or stored 420. In an example embodiment using a DVD as the physical medium, the static path may be, for example /dvd-data. Appropriate static paths may be defined for any particular type of physical medium. In an example embodiment, this path may be a mounted partition of an encrypted hard-disk file system that may be locked for user access 424. Locking for user access 424 may protect content from being copied from the data storage device by unlicensed users or users without permission to share such data or content. In other words, the data may be protected so that it may only be used within a particular media-sharing network.

In an example embodiment, storing the data 420 may include creating a unique folder 426 within the static path and corresponding to the physical medium. The folder may be labeled, for example, with a unique identifier, for example the UPC associated with the content. Data may then be ripped from the physical medium 428 and stored in the folder 420. The entire data from the physical medium may be ripped 428 and stored 420 in the folder, including a primary content, special features, menus, navigation screens or other features on the medium that are not part of the primary content of the medium.

The content may be stored 400 in such a way that the data structures, files, folders and/or containers representative of the backed-up content present themselves to the media sharing network as 'virtual' physical media, capable of being played back on a media renderer on the network with no loss of functionality from the physical medium. In other words, the backed-up content may be played with all of the functions, features and functionality that would be available to a physical medium server user. This may improve the user experience for users who backup physical medium content onto digital data storage devices.

In an example embodiment, storing the data 420 may also include creating a folder 426 and subfolders 430, for example a metadata folder and a content folder, respectively. For example, the media content of the physical medium may be stored in a file format, as discussed further below with respect to FIG. 4, with an example data location of /dvddata/[unique ID code (e.g. UPC)]/VIDEO_TS. The metadata may be available as a metadata.xml file stored within the metadata folder. The metadata folder may be defined 428 or addressed and located, for example, at /dvddata/[unique ID code (e.g. UPC)]/META. The metadata file may be known to both the server on which the content is stored 420 and a media sharing enabled client on the network.

In an example embodiment, storing the data 420 may include assembling a container 440, in which the content data and metadata may be wrapped. Assembling the container may include assembling a file that contains URLs and protocol information for all of the files in the associated VIDEO_TS and META folders. For example, a DLNA container may be assembled 440 containing the URL's and protocol information for the files. Since the content folder's (e.g. VIDEO_TS folder) size and number of files is dynamic, the first URL in the file may be the thumbnail and the second URL may be to the metadata file (e.g. meta.xml file). In cases where no metadata has been or could be retrieved from an online metadata server, the metadata fields may be filled with "unknown," and a "thumbnail" file may be represented by a default thumbnail.

In an example embodiment, browse requests from a control point looking for content files with a particular media format (e.g. DVD, BluRay or HD-DVD files) should return a list of individually backed-up media content using content identifying information (e.g., a movie title) as the header. In an example embodiment, a browse request may return a list of DLNA containers using the movie name as the header and with content corresponding to a physical medium content as described above.

In an example embodiment, sharing content 330 (FIG. 3) may be enabled by providing the content in a data structure compatible with a media sharing protocol, such that the stored content presents itself to the network as a "virtual" physical medium and may be accessed and played back on the network using a standard physical medium playback protocol over the plug and play network.

Figure 5:
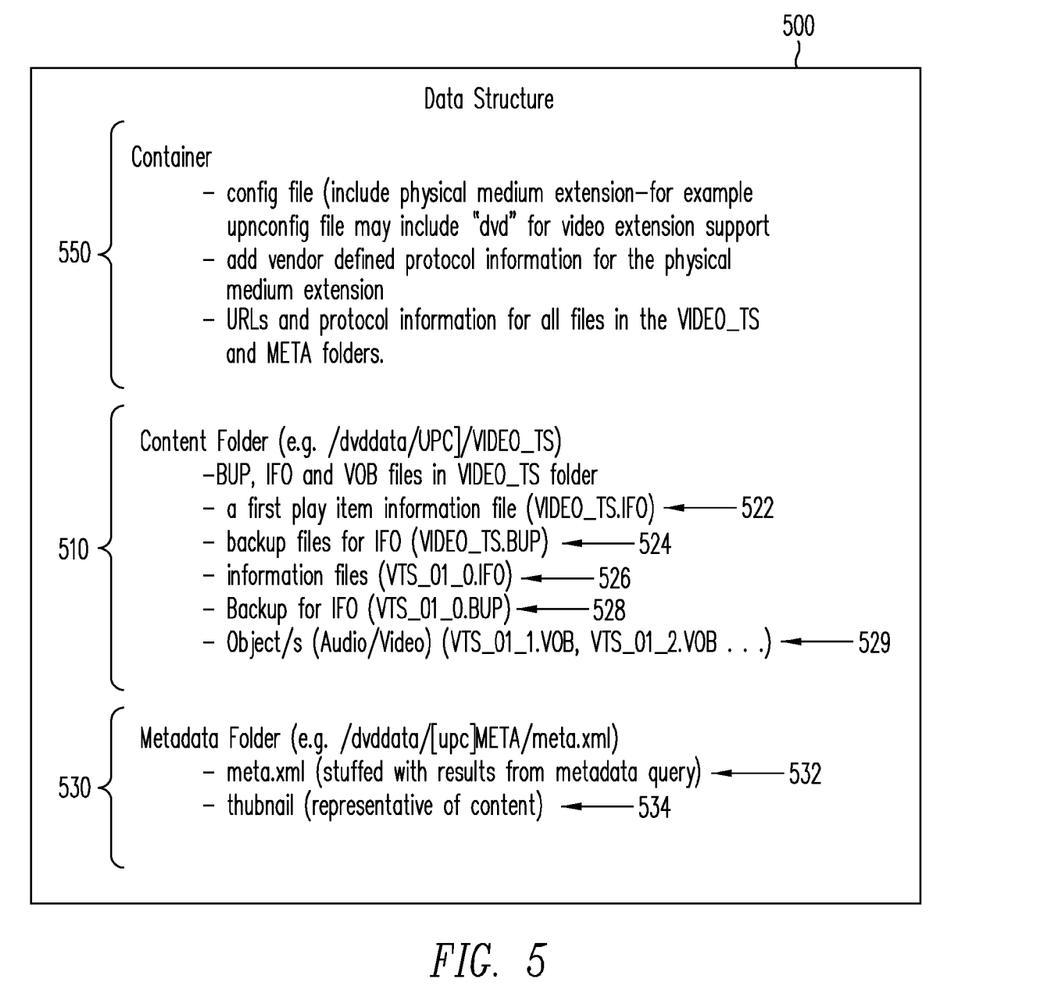
FIG. 5 is a block diagram of an example embodiment of a data structure for content stored on a media-sharing network.

FIG. 5 illustrates an exemplary embodiment of a data structure 500 (219 in FIG. 2) for backed-up content from a physical medium, enabling sharing, access and playback over a media sharing network. The data structure 500 may include a content file folder 510, a metadata file folder 530 and a container 550. The content file folder 510 and the metadata file folder 530 may be wrapped up in the container 550.

In an example embodiment, a content file folder 520 (e.g. VIDEO_TS) may include BUP, IFO and VOB files. For example, the content file folder 520 may contain a first play item information file (VIDEO_TS.IFO) 522, backup files for IFO 524 (VIDEO_TS.BUP), information files 526 (VTS_01_0.IFO), backup for IFO 528 (VTS_01_0.BUP) and Video Object/s 628 a1-aN (Audio/Video) 529 (VTS_01_1.VOB, VTS_01_2.VOB . . . VTS_01_N.VOB). The video objects may be stored in smaller files or "chunks", for example, 1 GByte chunks, which together may for a larger data file, for example a video object. In an example embodiment, the metadata file folder 530 (/dvd/[UPC]/META) may include a metadata.xml file 532 and may include a thumbnail 534 associated with the physical medium content.

Figure 5A:
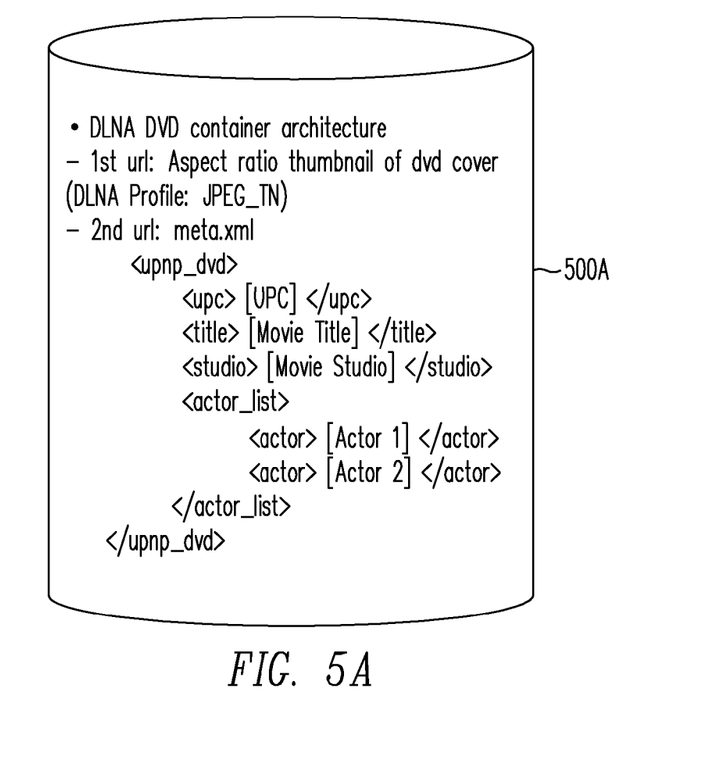
FIG. 5A illustrates an example embodiment of a container architecture of the data structure illustrated in FIG. 5.

FIG. 5A illustrates an example embodiment of a container architecture 500A of a data structure of FIG. 5. The first url may be an aspect ratio thumbnail of a movie cover, for example and the second url may be a meta.xml file. The meta.xml file may include information relating to the type of medium (e.g. dvd), the unique identifier of the content (e.g. UPC), and additional information related to the production, including movie title, studio, actor(s) and the like.

DLNA DMS Modifications:

In an example embodiment, playing content 340 (FIG. 3) may include providing a digital media server with a configuration file or other identifying data for providing information to the media sharing network that the device supports playback from the physical medium or media that may be backed-up to the device. For example, in a UPnP network, a digital media server may include a device description file, or "config file," that includes the dvd extension. A device description file may be an XML file containing information about the device. The device description file may include certain mandatory fields for UPnP and DLNA protocol compatibility, but may also contain optional fields. A device description file may have a size limitation, but have sufficient space for including proprietary or optional fields/attributes. A device description file may contain information about IP address and manufacturer capabilities in terms of available control actions. For example, where a particular device supports seek functions but not fast forward, these capabilities or limitations may be listed in a device description file. The device description field may also include a list of supported media formats. In an example embodiment, a digital media server may indicate the ability of the device to support DVD.

Figure 6:
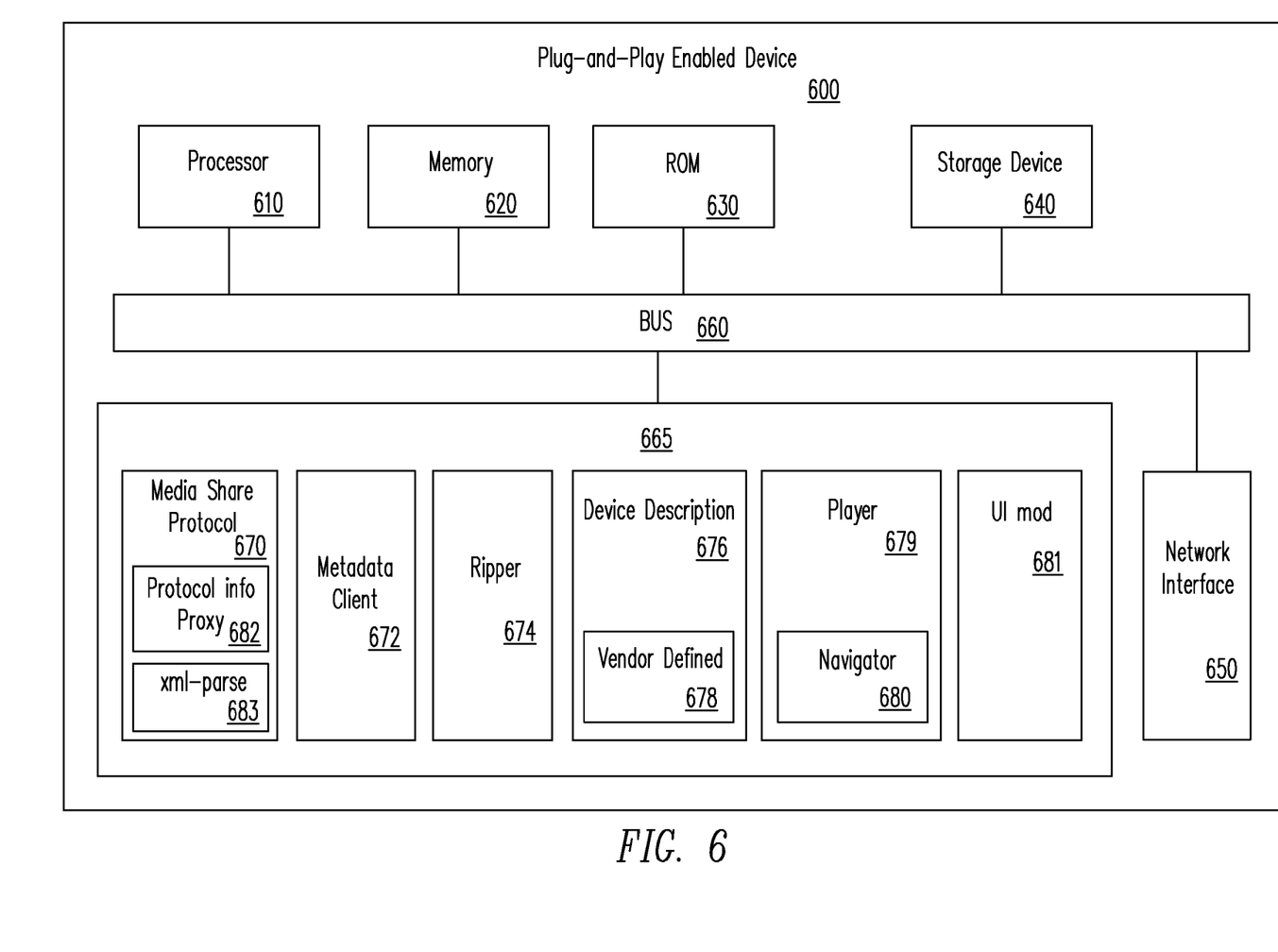
FIG. 6 is a block diagram of an example embodiment of a media sharing enabled device.

FIG. 6 illustrates an example embodiment of a media sharing enabled device 600. In an example embodiment, the device 600 may include a processor 610, a memory 620, a ROM 630, a data storage 640, a network interface 650 and a bus 660. The device may also include media sharing protocol instructions 670, for example, a plug-and-play stack, stored in electronic medium for performing operations and enabling operation of the device on a media sharing network 100, 200 (FIGS. 1 and 2). The instructions 670 may be stored in memory, ROM, on the storage device or in firmware or any other appropriate format. In an example embodiment, the media sharing protocol may include an xml parser 683 and a protocol information proxy 682. The xml parser may extract metadata 706 from the meta.xml file and render it 709 (FIG. 7) through an interface, for example, a graphical user interface (GUI). The protocol information proxy 671 may ensure proper communication between a UPnP stack and a DVD navigator 680.

In an example embodiment, the device 600 may be a network attached storage (NAS) device for backing-up physical media for playback on the media sharing network. The NAS may be a digital media server with supporting hardware and software for playback of electronically backed-up content from a physical medium. The device may also be a digital media server (DMS).

The device 600 may include hardware and software instructions which perform the steps described elsewhere in this disclosure relating to getting content 310, storing content 320, sharing content 340 and playing 340 or rendering content (FIG. 3). The device 600 may also have a number of applications 665 stored as software, firmware and supported by appropriate hardware. In addition to the media sharing protocol 670, the device 600 may have, for example, a metadata client 672, for example GRACENOTE or AMG, and a "ripper" application 674, suitable for copying data from a physical medium and storing it in data storage. The ripper 674 may rip data from a physical medium when it is loaded in a physical media server, for example when a disc is loaded in a disc loader or disc drive. The ripper may be used with a DVD/BluRay navigator for direct playback when the device is a DMP. The device 600 may support wrapping physical media folders to media containers, for example DLNA media containers and support presenting the media as a single playable object or "virtual physical medium".

In an example embodiment, the device may be configured to advertise to a network that it supports sharing of physical media containers. For example, the device 600 may have a configuration file 676 that provides information to the network about what data types may be played back from the device. In an example embodiment, the configuration file 676 may include an extension indicating that a physical medium may be played back from the device, even though the device does not have an actual physical medium server. The extension will enable the network to find and play back 'virtual' physical media backed up and stored in data structures on the storage device or server. For example, the configuration file 676 may be modified to include an extension for DVD, HD-DVD or BluRay content. In the case of a UPnP network, for example, a "config" file may modified so that the network may provide the proper media-specific support. For example, where the medium is a DVD and the network is a UPnP/DLNA-enabled network, the letters "dvd" may be added to the UPnP device description or "config" file for video extension support. For example, "mpg2, mp4, wmv" may be changed to "mpeg2, mp4, wmv, dvd."

In an example embodiment, the device 600 may include a vendor-defined protocol information 678 related to the physical medium extension (e.g. 'dvd'). A DLNA profile may be, for example: DVD_REG[Region]_[TV Standard}, for example: NTSC, DVD_REG2_PAL.

In an example embodiment, the "dvd" extension may not work as an actual extension serving *.dvd files, but may be implemented as a virtual extension that serves a predefined data structure 500 (FIG. 5), for example a DLNA container with url's to the content and metadata associated with a particular physical medium.

Persons of ordinary skill in the art will appreciate that some functions such as the metadata client, ripper, config or configuration file and vendor-defined protocols may be resident on one device or on multiple, separate devices on the same network.

In an example embodiment, the device 600 may be implemented using protocol and methods relating to UPnP (for example UPnP AV), DVD navigation commands and ATAPI commands. A network attached storage device used to back up DVD media may be referred to as a DVD media vault. Such a media vault may include a network attached storage unit (NAS) with a given amount of storage space 640, preferably enough storage space to store the content, metadata and features from a number of DVDs. The DVD media vault may have DLNA 1.5 compliant digital media server (DMS) functionality, modified for virtual DVD playback. Although this example relates to DVDs, a person of ordinary skill of the art would appreciate that it could be extended to other physical media including, for example, BluRay and HD-DVD.

Client Playing content

In an example embodiment, the media sharing enabled device 600 may be a digital media player (DMP) that includes a playback client application 679 with a physical medium navigator 680 module. The networked device 600 with player application 679 and navigator 680 may be referred to as a "virtual player". In an example embodiment in which the physical medium is a DVD, it may be a virtual DVD player with DVD navigator 680. The player may support the media profile for physical media and the data structure, for example container layout, in which the content and/or metadata has been stored and/or in which it has been wrapped up. The playback may be performed or controlled from media sharing media controls, for example from UPnP media controls. A user interface (UI) may tie into the player or playback client application 679 to user to interface with or interact with the system to navigate media content and/or issue desired player commands.

In an example embodiment, a virtual physical media playback device may be referred to as a Digital Media Adapter. In the case of playback of DVD content, the Media Adapter may be modified DLNA 1.5 compliant with digital media player (DMP) and/or digital media render (DMR) functionality. It may also have a built-in DVD navigator. A physical DVD loader/drive may be an optional feature. Although this example relates to DVDs, a person of ordinary skill of the art would appreciate that it could be extended to other physical media including, for example, BluRay and HD-DVD.

Although FIG. 6 illustrates an example embodiment in which the playback client application 679 is resident on the same device as the storage and/or media server functions, it is understood that a playback client may be resident on a separate media sharing device, such as a control point, on the same network. In an example embodiment, the device 600 may be a DLNA DMP protocol-enabled device and may support playback of a particular physical medium format or formats. For example, the playback client may support playback of BluRay, DVD or HD-DVD discs.

DMP Modifications

In an example embodiment, the playback client application 679 may include a video extension support file and the appropriate physical media format extension for playback of virtual physical media may be included in the video extension support file. For example, for playback of backed-up DVD content, the dvd extension may be added to the video extension support.

Virtual DVD

In an example embodiment, a playback client may include support for a virtual DVD drive. For example, it may include instructions for performing the example playback method illustrated in FIG. 7.

Figure 7:
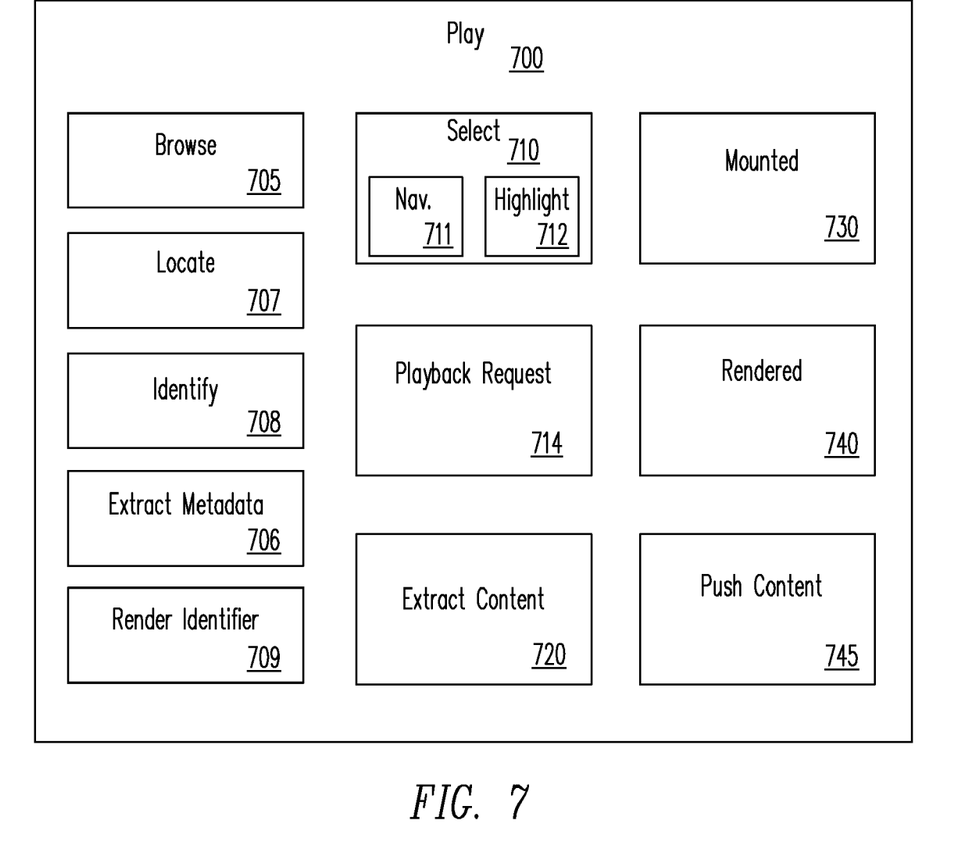
FIG. 7 is a block diagram of an example embodiment of a method of playing back media on a media-sharing network.

FIG. 7 illustrates an example embodiment of a method 700 of playing media on a media sharing network. In an example embodiment, the playback client application 679 (FIG. 6) may present browse requests 705 and locate media data structures 707 stored in storage or on a server. A browse request is presented 705 when a user navigates to the media server via a user interface, for example using a remote control to select an option presented on a television screen. The browse request 705 may request a content directory service root directory from a media server. The request may include a device description of the media player that shows DVD support. The media server may send a root folder to the media player to facilitate the user in locating media data structures 707 stored on the server. A user may receive three folders, audio, video and pictures. In an example embodiment, the media server may generate a subfolder from a request by applying a filter to show only video files supported by the media player, including DVDs, based on the device description received from the media player in the browse request.

In an example embodiment, a user may then navigate into the video folder and browse the video folder to identify content 708 stored on the server. The user may identify content 708 by browsing into the video folder. A background process may open all of the DVD containers, download thumbnails from the first url in the container and display them in a list view on the media player screen. The content and format of the data structures stored in storage or on a server enable a browse request to locate 707 and identify content 708 stored in the data structures 500 (FIG. 5) as though the content were available on a physical medium. The content may be represented by a content identifier or identifiers, such as a thumbnail image or title stored in the data structure. The content identifier(s) may be rendered 709 on a media renderer, for example in a thumbnail view and/or by title or other identifying image or text. The thumbnails shown may be the thumbnails downloaded from the metadata server and stored in the data structures of the backed-up physical media content. This may be achieved by reusing or modifying a photo viewing user interface (UI) module 681 (FIG. 6) available on the playback client. The playback client may also include an xml parser 683 (FIG. 6) that can extract metadata 706 from the meta.xml file and render it 709 thru an interface, for example a graphical user interface (GUI).

In an example embodiment, a user may select a particular content, based on the list presented, including thumbnails if present. The media player may then extract additional metadata 706 from the server, including, for example, information about the movie. The information may be presented in a manner formatted by the media player manufacturer, using data sent in a metadata.xml file from the media server to the player.

In an example embodiment, a user may select content 710 and initiate a playback request 714. The content may be selected 710 by navigating 711 a graphical user interface and highlighting 712 a content identifier. The playback request may be made by pressing a physical or virtual "play" button on a controller or via a user interface. Content may be extracted 720 from the data structure 500 (FIG. 5) (e.g. DLNA container) and files in the structure, for example a content folder (e.g. VIDEO_TS folder), may be mounted 730 to the folder for the virtual physical medium using the original file names. In an example embodiment, the player may download all urls from the third row and up of the container, except for the VOB (actual video) files. Content may then be rendered 740 or played back using protocol identical to protocol for playing back the same content from its original physical medium, but using a "virtual" DVD drive. The media sharing system may push the content 745 to the renderer for rendering 740.

In an example embodiment, a background process may generate a proxy layer for the DVD navigator supported in the player. The proxy layer may include all of the downloaded files and include a "fake" destination for the video files (VOB). The video files may then be downloaded on demand, whenever the DVD navigator needs them. This may avoid the necessity of caching the video files because they may be too large to conveniently cache. The user may browse through a menu, for example a DVD or BluRay content menu, and select to play the movie. The player then downloads the needed VOB file and starts playing the content.

In an example embodiment, a digital media server may not "rip" all of the content from a physical medium, but may create data structures sufficient to browse media and playback media that is mounted in a multiple physical medium player or carousel. For example, the data structure of FIG. 5 may not include the content folder 510. The media content on the physical medium may be accessible by generating playback requests to the data structure. The Metadata folder 530 (FIG. 5) may include URLs to the features of the physical medium for access and playback from the physical medium. By playing 700 the physical medium by browsing 705 the data structures 500 (FIG. 5) and initiating playback 714 from a media sharing player or controller, a user may browse a variety of content available physically on a carousel, but without having to browse all of the physical media separately. When the content is played, the content may be extracted from the physical disc based on URLs stored in the metadata folder. In an example embodiment, such an implementation may avoid potential user rights issues in certain user regions or jurisdictions. The metadata folder, for example, could be extended to support additional features not available on the original physical medium.

In an example embodiment, a digital media server may provide for "guest" media playback. For example, it may create data structures with Metadata folder 530 with URLs to the features of the physical medium, but without a full content folder. The content may be browsed, identified and playback initiated via the data structure, but the metadata file may point to the data on the disc for playback. A system may provide for "guest" media playback where user rights may forbid copying a disc for which the network owner may not have the right to copy a physical medium. This may permit a user to play user media in the same way that they would play their own backed-up media, without changing controllers, thereby streamlining the user experience.

In an example embodiment, copy protection requirements may be upheld by restricting access to copy protected NEPs using, for example, DTCP/IP if they are required to be protected. A server may parse information structures within an NEP only to the extent that it can determine whether the presentation should be protected or not.

In an example embodiment, the data structure 500 (FIG. 5) may include additional information or content not ripped or downloaded from the physical medium. Such additional information or content may be associated with the content stored in the data structure. The additional information may include subtitle files that may not have been provided in or available on the original physical medium. Such files may be downloaded from a server and displayed or rendered when the content in the data structure is rendered or displayed on the network.

In an example embodiment, the additional information or content may include files related to additional playback options including, for example, home automation profiles. Such home automation profiles may provide for control of ambient lighting in a room in which a renderer displays content from a data structure. For example, an automation profile may provide pre-programmed lighting effects on lights connected to and controllable from the network. Lighting effects may include, for example, soft lighting for dramatic movies, dimmed lights when a shot is in a dark environment, interactive lighting that changes with the content of the visible portions of the screen, dramatic action or other factor. In other examples, such profiles may include motion effects, temperature effects, scent effects, wind effects or any other controllable, sensible effect that might be related to content being rendered to improve a user's experience when rendering entertainment or other content in a network environment.

In an example embodiment, the 'virtual physical media' data structures of this disclosure may be stored on a server that is outside of a local or home network, and may be accessible over a network access port via an outside network, such as the internet. Such an outside server could store the content of various physical media, for example a library of DVD, Blu-Ray Disc or other physical media titles, and could provide access to such 'virtual physical media' for a fee. For example, instead of going to a local store to pick up a DVD or waiting for a DVD in the mail, an entire DVD may be made available for playback virtually over an outside network. A user with a compatible media sharing system could control playback of the virtual DVD with full access to the menu, languages, sub-titles, multiple angles, commentary tracks and other features as though it were a physical DVD. Such virtual physical media rentals would provide a user with a full DVD experience without the logistical support of mail-in rentals or the added burden of driving to a physical rental store to browse and select a movie or other media content contained on a physical medium such as a disc. The browsing features could be used to identify, select and play such virtual DVDs.

In an example embodiment, an operator of such an outside server may acquire proper licenses, rights or permissions to provide such content, may implement appropriate security procedures to prevent or inhibit unauthorized access or copying, and may provide services to subscribers or customers under a limited use, viewing or other appropriate license.

Although backing up and playing content from a digital media server may take more data storage space than ripping just the main content from a physical medium and encoding the medium, the decrease in cost per gigabyte over time may make such storage and playback even more desirable. The time and effort involved in ripping a disc and encoding a movie to save disc space may be more costly in the future than the extra storage space required for a virtual physical medium. Currently, ripping an entire DVD and storing it as a virtual DVD may take as much as five to about ten GB, whereas a high-quality encoder may create a video file of only about one to two GB to render a movie in nearly the same quality as the physical DVD. Spending the time and effort to rip and encode only the main feature of a DVD to save four to eight GB of storage space may be increasingly less desirable in the future as the cost of data storage decreases. For some users, the convenience and increased functionality of the 'virtual physical medium' experience may outweigh the effort, time and limited functionality of ripping and encoding only the main feature of a DVD.

In an example embodiment, a digital media server may enable playback from a non-DVD enabled digital media renderer.

In an example embodiment, an HW encoder may be used to stream physical medium navigator (for example DVD navigator) output.

In an example embodiment, keeping the video files separate, but unmodified, may enable transcoding of the video signal, in which video quality is reduced while decreasing bandwidth usage. Transcoding may be desirable where network bandwidth is limited or where it is desirable to reduce network bandwidth usage. Server side trick modes for a network attached storage device with transcoding capabilities may provide for remote access of content, for example remote access from a computer over the internet or a cell-phone.

Therefore, it should be understood that the invention can be practiced with modifications and alterations within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A non-transitory computer-readable medium comprising a plurality of machine-readable instructions which when executed by one or more processors of a server are adapted to cause the server to perform a method comprising:
   sensing the presence of a physical medium loaded on a media-sharing network;
   sensing the presence of metadata and content on the physical medium;
   copying the content on the physical medium, wherein a first portion of the content containing metadata cannot be copied;
   locating the first portion of the content in a metadata server;
   copying the first portion of the content from the metadata server;
   wrapping the metadata, the first portion of the content, and the content in a container, wherein the container includes a location of the metadata and a location of the content; and
   assembling the container such that it is recognized as a virtual physical medium on the media sharing network and such that it enables playback of the content by control commands compatible with a media sharing protocol.

2. The non-transitory computer-readable medium of claim 1, wherein the location of the metadata and the location of the content are represented by uniform resource locators (URLs).

3. The non-transitory computer-readable medium of claim 1, wherein the location of the content is on the physical medium.

4. The non-transitory computer-readable medium of claim 1, wherein the locating comprises:
   extracting a unique identifier of the physical medium; and
   using the unique identifier to query the metadata server the first portion of the content.

5. The non-transitory computer-readable medium of claim 4, wherein the method further comprises:
   storing the metadata and first portion of the content in a first folder in the container; and
   storing the content in a second folder in the container.

6. The non-transitory computer-readable medium of claim 5 wherein the first portion of the content comprises a thumbnail image corresponding to the content.

7. The non-transitory computer-readable medium of claim 5, wherein the content is divided into a plurality of smaller sub-files.

8. The non-transitory computer-readable medium of claim 5, wherein the second folder includes, a first play item information files, backup files for the information files and video objects.

9. The computer-readable medium of claim 5, wherein the first folder includes a metadata.xml file.

10. The non-transitory computer-readable medium of claim 1, wherein the container comprises at least one of a group including Digital Living Network Alliance (DLNA) and Universal Plug and Play (UPnP) container.

11. The non-transitory computer-readable medium of claim 1, wherein the media-sharing protocol comprises at least one of Digital Living Network Alliance (DLNA) and Universal Plug and Play (UPnP).

12. The non-transitory computer-readable medium of claim 1, wherein the physical medium comprises one of Digital Versatile Disc (DVD), High Definition Digital Versatile Disc (HD-DVD) or Blu-Ray Disc.

13. A media sharing network compatible device, comprising:
   a physical medium server for loading at least one physical medium onto a media-sharing network;
   a non-transitory computer-readable medium, coupled to the physical medium server and comprising a plurality of machine-readable instructions which when executed by one or more processors of the server are adapted to cause the server to perform a method comprising:
     sensing the presence of the at least one physical medium when loaded on the media-sharing network;
     sensing the presence of metadata and content on the physical medium;
     copying the content on the physical medium, wherein a first portion of the content containing metadata cannot be copied;

locating the first portion of the content in a metadata server;

copying the first portion of the content from the metadata server;

wrapping the metadata, the first portion of the content, and the content in a container, wherein the container includes a location of the metadata and a location of the content; and assembling the container such that it is recognized as a virtual physical medium on the media sharing network and such that it enables playback of the content by control commands compatible with a media sharing protocol.

14. The media sharing network compatible device of claim 13, wherein the container enables playback of the content when the location of the content is on the physical medium.

15. The media sharing network compatible device of claim 14, wherein the physical medium server includes a plurality of physical medium drives, wherein each drive may load one of a plurality of physical media.

16. The media sharing network compatible device of claim 13, wherein the container enable playback of the content when the location of the content is a content folder into which the content was downloaded and stored.

17. The media sharing network compatible device of claim 16, further comprising network attached storage, wherein the location of the content is on the network attached storage.

18. A method of sharing media on a media-sharing network, comprising:

sensing the presence of a physical medium loaded on the media-sharing network;

sensing the presence of metadata and content on the physical medium;

copying the content on the physical medium, wherein a first portion of the content containing metadata cannot be copied;

locating the first portion of the content in a metadata server;

copying the first portion of the content from the metadata server;

wrapping the metadata, the first portion of the content, and the content in a container, wherein the container includes a location of the metadata and a location of the content;

assembling the container such that it is recognized as playable item the media sharing network and such that it enables playback of the content by control commands compatible with a media sharing protocol;

issuing browse requests to view playable items on the network;

selecting the content corresponding to the container;

playing the content by accessing the metadata, the first portion of the content, and content at the location of the metadata and the location of the content represented in the container.

19. The method of claim 18, wherein the content is located on the physical medium.

20. The method of claim 18, wherein the content is located in a content folder in the container.

21. The method of claim 18, further comprising:

extracting a unique identifier of the physical medium; and using the unique identifier to query the metadata server for the first portion of the content.

* * * * *